United States Patent [19]
Abraham

[11] 3,809,092

[45] May 7, 1974

[54] CONTACT LENS FOR VIEWING FLUORESCENT EYE TISSUE

[76] Inventor: Samuel V. Abraham, 16026 Royal Oak Rd., Encino, Calif. 91316

[22] Filed: Apr. 13, 1972

[21] Appl. No.: 243,773

[52] U.S. Cl. ................. 128/305, 128/2 R, 128/395, 350/311, 351/162
[51] Int. Cl. ........................ A61b 17/32, A61b 6/08
[58] Field of Search ....... 128/1 R, 23, 303 R, 303.1, 128/305, 395; 350/311; 351/162

[56] References Cited
UNITED STATES PATENTS

| | | | |
|---|---|---|---|
| 2,117,312 | 5/1938 | Gauly | 128/303 R |
| 2,809,556 | 10/1957 | Hornstein | 351/162 X |
| 3,261,978 | 7/1966 | Brenman | 128/395 UX |
| 3,659,607 | 5/1972 | Banko | 128/305 |
| 3,645,254 | 2/1972 | Burton | 128/23 |

OTHER PUBLICATIONS

Kleyhauer, Alfred D., "Tinted Contact Lenses: Equivalent Absorption of Spectacle Lenses," Jour. Amer. Optom. Assoc. 35 :487,488. 1964.
Soehnges, C. P., "New Designs for Tinted Corneal Lenses," Contacto, 12: : 56–59. 1968.

*Primary Examiner*—Channing L. Pace
*Attorney, Agent, or Firm*—Flam & Flam

[57] ABSTRACT

During eye surgery, particularly cataract removal, visibility of lens and capsule tissue in the eye is enhanced by placing on the cornea a contact lens having a color near the ultraviolet end of the visible spectrum. Light projected into the eye causes the lens and capsule material to fluoresce and become readily discernable to the surgeon through the colored contact lens.

8 Claims, 3 Drawing Figures

PATENTED MAY 7 1974 3,809,092
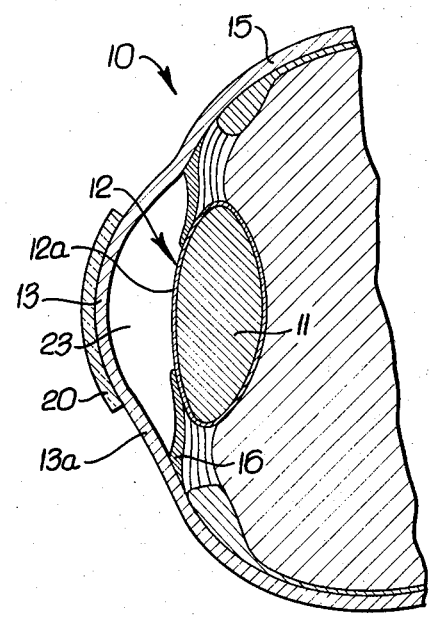
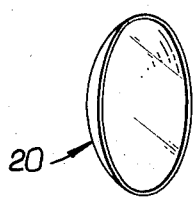
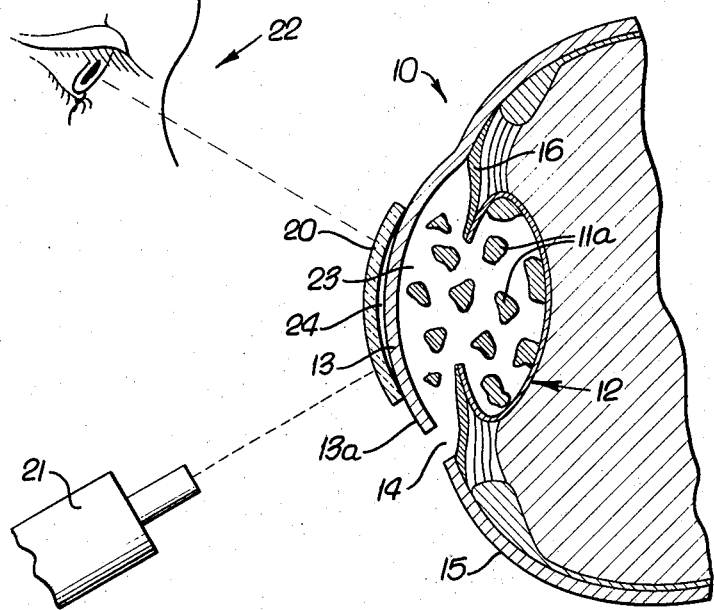

ary, 3,809,092

CONTACT LENS FOR VIEWING FLUORESCENT EYE TISSUE

BACKGROUND OF THE INVENTION

1. Field of the Invention

The present invention relates to the use of a colored contact lens to view fluorescing eye tissue during ophthalmological surgery.

2. Description of the Prior Art

Cataract surgery involves the removal from the eye 10 (FIG. 1) of lens 11 or capsule 12 material which has become so occluded or clouded as to prevent the transmission of light from the cornea 13 to the retina. Intracapsular extraction is performed by making a semicircular incision 14 (FIG. 2) along the limbus where the cornea 13 joins the sclera 15. Working through this opening, the surgeon removes the lens 11 and capsule 12 intact. For extracapsular extraction a scalpel and forceps may be used to cut away and remove a portion of the anterior capsule 12a. The lens tissue 11 then is broken into particles 11a which are removed through the incision 14.

Certain of the particles 11a may not be seen by the surgeon because they are transparent or otherwise do not stand out from the visual background. As a result, particles may be left in the eye after the incision 14 is sutured to complete the operation. The residual particles may cause complications such as inflammation or secondary glaucoma. Residual epithelium fibers may form a new membrane over the capsule 12 posterior, requiring a subsequent operation for removal of the membrane.

Seeing transparent lens 11 or capsule 12 material also is important should the lens rupture during other eye surgery. The surgeon must see what has happened to take the necessary corrective action.

An object of the present invention is to provide a technique and apparatus for enhancing the visibility of lens and capsule tissue during ophthalmological surgery.

SUMMARY OF THE INVENTION

This objective is achieved by taking advantage of the fluorescent properties of the lens 11 and the capsule 12. When excited by white light or other light of appropriate wavelength, this eye tissue fluoresces, emitting light near the ultraviolet end of the visual spectrum. Providing the eye 10 with a loosely fitting contact lens 20 of cobalt blue or like color causes the fluorescing lens particles 11a to become clearly visible to the surgeon.

BRIEF DESCRIPTION OF THE DRAWINGS

A detailed description of the invention will be made with reference to the accompanying drawings wherein like numerals designate corresponding parts in the several figures. These drawings are to scale.

FIG. 1 is a transverse sectional view of a human eye provided with a contact lens in accordance with the present invention, preparatory to eye surgery.

FIG. 2 is a transverse sectional view like FIG. 1, indicating wherein fluorescing eye tissue is viewed through the colored contact lens during cataract surgery.

FIG. 3 is a perspective view of the contact lens of FIG. 1.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention is best defined by the appended claims.

Referring to the drawings, the visibility of fluorescing eye tissue is enhanced by providing on the cornea 13 a contact lens 20 having a color near the ultraviolet or short wavelength end of the visual spectrum. Typically the lens 20 may be made of cobalt glass having a deep ("cobalt") blue color. Alternatively, the lens 20 may be made of other types of glass or of plastic appropriately pigmented to transmit the light emitted by the fluorescing eye tissue.

The lens 20 preferably has a diameter of about 7 or 8 millimeters. The diameter of the cornea 13 typically is on the order of 11 millimeters. Thus when the contact lens 20 is centrally positioned on the cornea, an annular portion 13a of the cornea remains uncovered for access by the surgeon. However, the contact lens 20 diameter is sufficient to provide the surgeon with a satisfactory field of view. The lens 20 can be moved as required to view different areas of the eye.

A light source 21 is used to excite fluorescence of the eye tissue. The source 10 may comprise a white spotlight directed through the cornea 13 to the operative site. Light from the source 21 may be projected through the contact lens 20, or through the surrounding corneal region 13a. The incident light causes the lens 11 and capsule 12 material to fluoresce, emitting light which is readily visible to the surgeon 22 through the blue contact lens 20. The contact lens 20 filters out light reflected from other portions of the eye 10, so that the fluorescing tissue stands out sharply.

Using the illustrated technique, all of the particles 11a will be readily visible, substantially reducing the chance of leaving residual lens tissue in the eye. Similarly, should the lens rupture during other surgery, the doctor will have a clear view of exactly what has happened.

The curvature of the contact lens 20 is relatively unimportant, as the lens is not intended to be vision corrective. The contact lens of course is removed when the surgical procedure is over. Preferably the lens 20 should fit loosely over the cornea 13. The contact lens 20 need not conform exactly to the corneal curvature. The normal eye fluids or the liquid used to moisten the cornea during surgery will fill the space 24 between the contact lens 20 and the cornea 13 without hindering the vision enhancement function. Also during the surgery the lens 20 may slide somewhat freely on the cornea 13, as does a normal contact lens; this motion will not interfere with the function of the lens.

Intending to claim all novel, useful and unobvious features shown or described, I make the following:

1. A method for aiding the visibility of lens capsule tissue in the eye during ophthalmological surgery, comprising:

applying over the cornea of said eye a contact lens having a color near the short wavelength end of the visible spectrum, projecting light into said eye to excite fluorescence of said lens capsule tissue, and observing said fluorescing lens capsule tissue through said contact lens while performing said surgery.

2. A method according to claim 1 including the step of:

applying the contact lens over only a portion of the cornea, leaving the limbal area exposed.

3. A method according to claim 1 including the step of:

projecting white light into the eye to excite said fluorescence.

4. A method according to claim 2 employed during cataract surgery, and including the steps of:

forming a limbal opening eye, and removing all said fluorescing capsule and lens material through said limbal opening.

5. As an aid for surgery of the eye, a contact lens characterized in having a color near the ultraviolet end of the visible spectrum, a diameter of about 8 millimeters and a curvature loosely corresponding to that of the cornea, together with means for projecting light into said eye during said surgery to excite said fluorescence, said lens functioning to filter out substantially all light except that emitted by excited fluorescence of lens capsule tissue in said eye.

6. A contact lens according to claim 5 made of cobalt glass.

7. A contact lens according to claim 5 made of plastic and having a deep blue color.

8. A contact lens according to claim 5 having a radius of curvature less than the normal corneal curvature of said eye.

* * * * *